(12) United States Patent
Kasono

(10) Patent No.: US 7,744,358 B2
(45) Date of Patent: Jun. 29, 2010

(54) PATTERN TRANSFER DEVICE AND PATTERN TRANSFER METHOD

(75) Inventor: Osamu Kasono, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 724 days.

(21) Appl. No.: 10/594,893

(22) PCT Filed: Mar. 15, 2005

(86) PCT No.: PCT/JP2005/005043

§ 371 (c)(1), (2), (4) Date: Sep. 29, 2006

(87) PCT Pub. No.: WO2005/097470

PCT Pub. Date: Oct. 20, 2005

(65) Prior Publication Data

US 2007/0164463 A1    Jul. 19, 2007

(30) Foreign Application Priority Data

Mar. 30, 2004   (JP) .............................. 2004-098132

(51) Int. Cl.
B29C 59/02 (2006.01)
(52) U.S. Cl. ........................... 425/3; 425/385; 425/810; 425/DIG. 33
(58) Field of Classification Search ........... 425/3, 425/406, 810, DIG. 33, 385; 100/DIG. 917
See application file for complete search history.

(56) References Cited

U.S. PATENT DOCUMENTS

| | | | | |
|---|---|---|---|---|
| 3,887,312 A | * | 6/1975 | Seary | ............................. 425/3 |
| 4,743,190 A | * | 5/1988 | Brunnschweiler et al. | ... 425/149 |
| 5,352,394 A | * | 10/1994 | Fujita et al. | ................. 264/40.5 |
| 5,540,577 A | * | 7/1996 | Ishikawa et al. | ............ 425/150 |
| 5,772,905 A | * | 6/1998 | Chou | ........................... 216/44 |
| 6,696,220 B2 | * | 2/2004 | Bailey et al. | ................. 425/385 |

FOREIGN PATENT DOCUMENTS

| | | |
|---|---|---|
| JP | 02-192045 | 7/1990 |
| JP | 05-285956 | 11/1993 |
| JP | 11-320587 | 11/1999 |
| JP | 2001-158044 | 6/2001 |
| JP | 2001-225342 | 8/2001 |
| JP | 2004-034300 | 2/2004 |

OTHER PUBLICATIONS

English machine Translation of JP11-320587.*
English machine Translation of JP2004-034300.*

* cited by examiner

*Primary Examiner*—Joseph S Del Sole
*Assistant Examiner*—Robert Dye
(74) *Attorney, Agent, or Firm*—Drinker Biddle & Reath LLP

(57) ABSTRACT

An object is to transfer a concavo-convex pattern formed on the surface of a transfer die onto a transfer target accurately. A pattern transfer apparatus according to the present invention is one for putting a transfer die having a concavo-convex pattern against a transfer target on a substrate to transfer the concavo-convex pattern onto a surface of the transfer target. It is characterized by comprising pressing means for pressing the transfer die against the transfer target on the substrate at a plurality of different locations independently.

8 Claims, 5 Drawing Sheets

(a)

(b)

PATTERN TRANSFER DEVICE AND PATTERN TRANSFER METHOD

TECHNICAL FIELD

The present invention relates to a pattern transfer apparatus and a pattern transfer method using the apparatus, and more particularly to a pattern transfer apparatus capable of transferring a fine concavo-convex pattern with accuracy and a pattern transfer method using the apparatus.

BACKGROUND ART

In the process of manufacturing an optical disc that records and reproduces information by using laser light or the like, an imprinting method has been employed in which a concavo-convex pattern including pits and guide grooves is formed on a resin by using a transfer die. More specifically, a transfer die having a shape pattern on its surface is initially created so as to have pits corresponding to projections, and projections corresponding to pits, of the concavo-convex pattern to be formed on the surface of a resin replica which constitutes part of the optical disc. This transfer die is pressed into a softened resin from above with pressure, the resin being applied onto glass or resin in a uniform thickness, thereby transferring the shape pattern on the surface of the transfer die onto the resin. After the resin is cured, this resin replica is released from the transfer die, and a recording film, a reflection coating, and the like are deposited thereon by sputtering or the like, thereby fabricating the optical disc.

The concavo-convex pattern of the resin replica mentioned above has been formed increasingly finer and at higher densities with increasing recording densities of information recording media. In such cases, the transfer die must be pressed into transfer targets with pressure higher than heretofore, and it is necessary to maintain the transfer targets and the transfer die more strictly in parallel with each other while bringing them closer and pressing in.

To address this problem, Japanese Patent Laid-Open Publication No. 2002-100038 discloses a jig which allows free relative movement between means for holding a transfer die and means for holding a transfer target while always maintaining them in parallel. More specifically, the transfer die and the transfer target (substrate) are both fixed to holding means of the jig while the parallelism therebetween is adjusted by using a CCD camera. It is stated that when the transfer die and the transfer target, accompanied by the jig, are subsequently transported to a hydraulic stamp press and put closer to each other, the transfer die can approach the transfer target in parallel and be pressed into the same. It is also stated that if an elastic member is interposed between the means for holding the transfer target and the hydraulic stamp press, it is possible to apply a uniform pressure to the transfer die and the transfer target for uniform transfer of the concavo-convex pattern.

DISCLOSURE OF THE INVENTION

In the process of pressing the transfer die into the transfer target on a substrate, the transfer die undergoes a reactive pressure from the transfer target against the press-in of the transfer die into the transfer target. This reactive pressure varies location by location within the area depending on the local densities of the concavo-convex pattern of the transfer die. Besides, since resin expelled by the press-in of the transfer die flows to the periphery, the reactive pressure acting on the transfer die varies even during the press-in process. For this reason, the parallelism between the transfer die and the substrate, even if adjusted before the transfer die and the transfer target make contact, can vary while the transfer die is pressed into the transfer target.

Then, the present invention provides a pattern transfer apparatus and a pattern transfer method for making it possible for a transfer die to be pressed into a transfer target in parallel all the time, thereby transferring a fine concavo-convex pattern with accuracy and high precision.

The pattern transfer apparatus according to the present invention is a pattern transfer apparatus for putting a transfer die having a concavo-convex pattern against a transfer target on a substrate to transfer the concavo-convex pattern onto a surface of the transfer target, the apparatus comprising pressing means for pressing the transfer die against the transfer target on the substrate at a plurality of different locations independently.

The pattern transfer method according to the present invention is a pattern transfer method for putting a transfer die having a concavo-convex pattern against a transfer target on a substrate to transfer the concavo-convex pattern onto a surface of the transfer target, the method comprising: a uniform pressing step of pressing the transfer die against the transfer target on the substrate uniformly; and a nonuniform pressing step of pressing the transfer die against the transfer target on the substrate at a plurality of different locations independently.

MODE FOR CARRYING OUT THE INVENTION

Embodiment 1

A pattern transfer apparatus according to a first embodiment of the present invention will be described with reference to the accompanying drawings.

Figure 1:
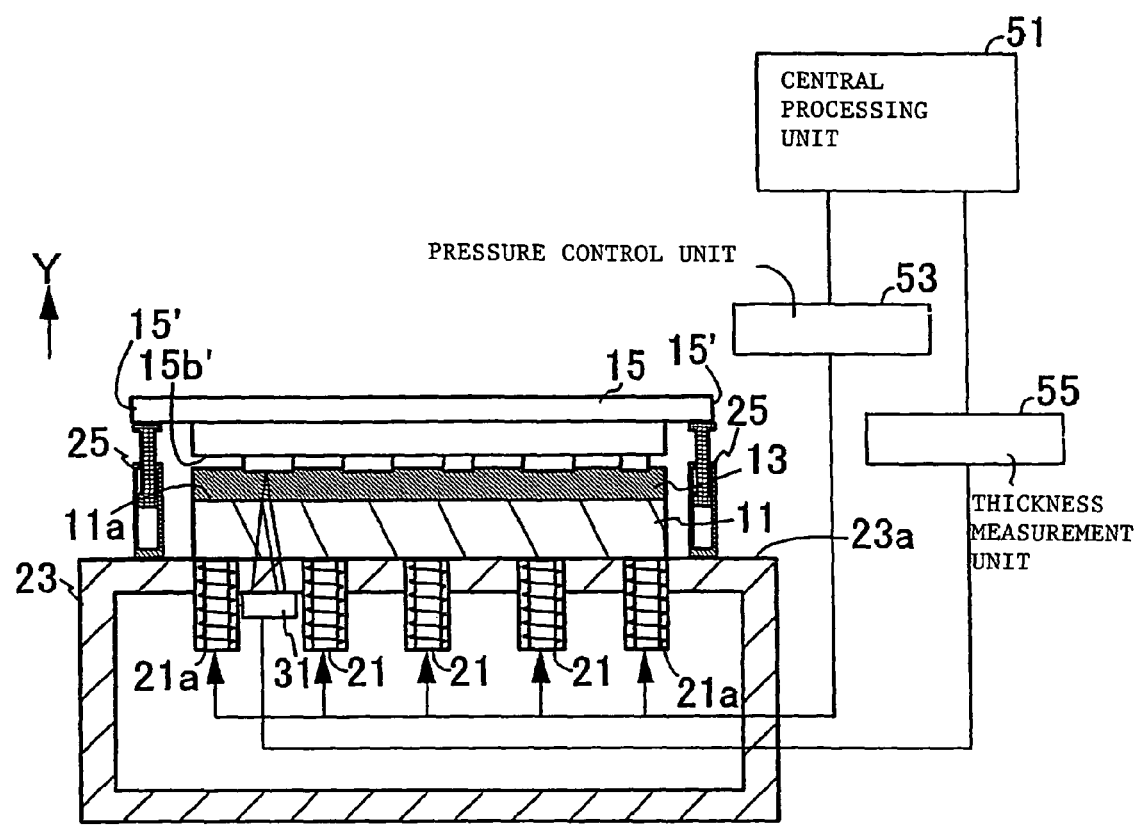
FIG. 1 is a diagram showing a pattern transfer apparatus according to a first embodiment of the present invention.
Figure 2:
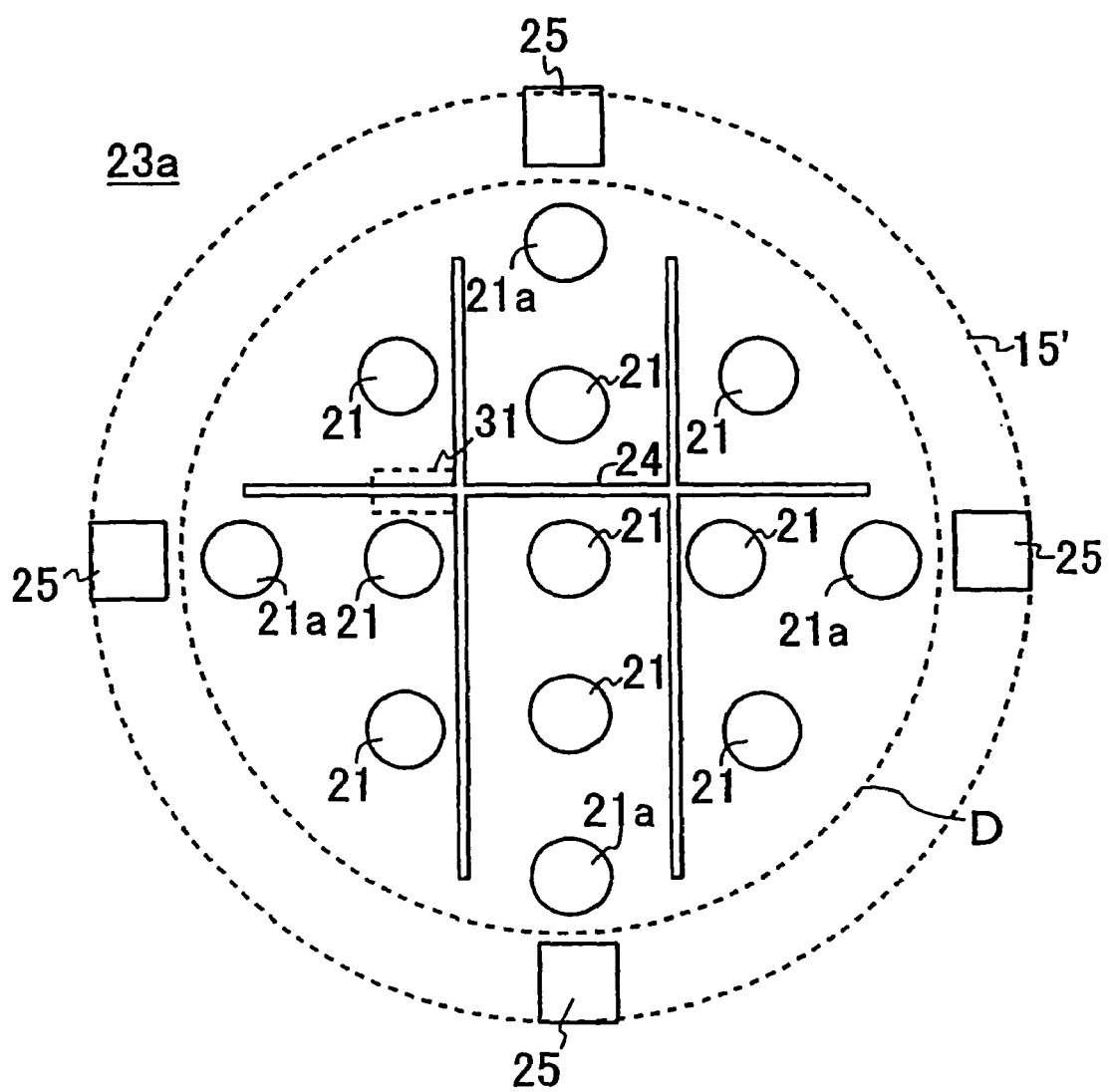
FIG. 2 is a diagram showing essential parts of the pattern transfer apparatus according to the first embodiment of the present invention.
Figure 3:
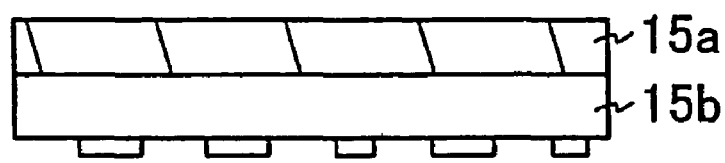
FIG. 3 is a diagram showing a transfer die of the pattern transfer apparatus according to the first embodiment of the present invention.
Figure 3:
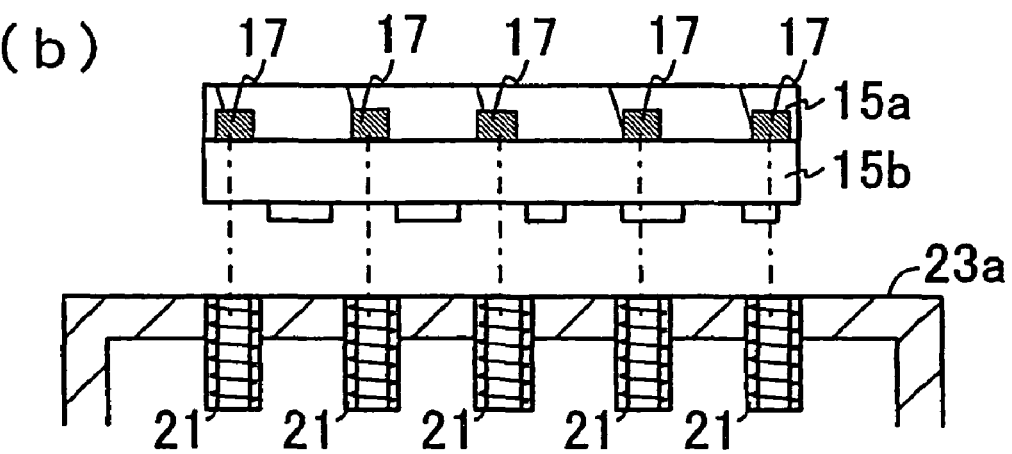

As shown in FIGS. 1 to 3, the pattern transfer apparatus according to the first embodiment of the present invention is an apparatus for transferring a concavo-convex pattern formed on the surface 15b' of a transfer die 15 onto a resin layer 13 on a substrate 11. The transfer die 15 is not pressed into the softened resin layer 13 from above (in −Y direction) by pressing means, but is attracted downward (in the −Y direction) by a plurality of electromagnets 21 (including 21a; the same holds unless otherwise specified) arranged below the substrate 11 so that it is pressed against the softened resin layer 13.

More specifically, the disc-shaped substrate 11 is fixed to the top surface 23a of a chassis 23. The substrate 11, along with the resin layer 13, must have a material and thickness such that magnetic forces from the electromagnets 21 can satisfactorily reach up to the transfer die 15. Typically, it is made of a nonmagnetic material such as polycarbonate and glass.

The electromagnets 21 are fixed to the chassis 23. The electromagnets 21 are preferably fixed so that their ends are flush with the top surface 23a of the chassis 23. This aims to reduce the distance between the electromagnets 21 and the transfer die 15 so that the magnetic forces from the electromagnets 21 can reach the transfer die 15 easily. In particular, as shown in FIG. 2, at least two or more, a plurality of electromagnets 21 are arranged in the chassis 23. As will be described later, some electromagnets 21a are placed near the edge of a position D for the substrate 11 to be fixed to. These electromagnets 21, as a role, are electromagnets 21 for compensating the inclination of the transfer die 15. Meanwhile, the other electromagnets 21 are appropriately arranged in several locations within the position D. These electromagnets 21, along with the foregoing electromagnets 21a, are ones for compensating local distortion of the transfer die 15. It should be noted here that the arrangement of the electromagnets 21 is not limited to the arrangement shown in FIG. 2. Each of the electromagnets 21 generates a magnetic force when supplied with an electric current from a pressure control unit 53 which receives a signal from a central processing unit 51. It should be appreciated that the electromagnets 21 may be any means as long as they can change the magnetic forces applied to the transfer die 15. For example, when using a permanent magnet, the means may include moving means that can move this permanent magnet closer to and away from the substrate.

The transfer die 15 is made of a material that can be attracted by the electromagnets 21. That is, it may be made of a ferromagnetic material, which typically is iron, cobalt, nickel, or an alloy of these and other elements. The transfer die 15 may also have a double layer structure as shown in FIG. 3(a), in which a flat plate 15a made of a ferromagnetic material is bonded with a concavo-convex die 15b having a concavo-convex pattern on its surface. The concavo-convex die 15b must have a material and thickness such that the magnetic forces from the electromagnets 21 can reach up to the flat plate 15a. On this account, the concavo-convex die 15b may be made of a nonmagnetic material such as glass and silicon. As shown in FIG. 3(b), permanent magnets 17 may be embedded in the flat plate 15a so as to correspond to the positions of the electromagnets 21. The reason is that the transfer die 15 is pressed into the resin layer 15 with a higher pressure due to the attractive forces between the electromagnets 21 and the permanent magnets 17. In such cases, the flat plate 15a need not necessarily be made of a ferromagnetic material. In particular, when the resin layer 13 is made of a photo-curable resin, the components other than the permanent magnets 17 are preferably made of light-transmitting materials so that it is possible to introduce light onto the resin layer 13 easily in the step of curing the resin of the resin layer 13 to be described later.

Moreover, as will be described later, the transfer die 15 is subjected to a pressure at a plurality of locations within the area distributedly. For this reason, the transfer die 15 does not require high rigidity which is necessary for conventional transfer dies. Moreover, with the apparatus according to the first embodiment of the present invention, it is possible to detect the distortion of the transfer die 15 area by area and apply locally different pressures to compensate this. It is therefore rather advantageous that the transfer die 15 does not have high rigidity, since the distortion can be detected accurately. The concavo-convex pattern of the transfer die 15 has tended to be denser recently and the pressure to be applied to the transfer die 15 is on the increase, while it is required to control the amounts of press-in of the transfer die 15 uniformly within the area at higher precision. This has typically required extremely precise machine operations and machine accuracy so as to enhance the rigidity of the transfer die 15, with the problem of increased manufacturing cost. The transfer die 15 according to the present invention is particularly effective against such a problem. Moreover, with conventional transfer dies having high rigidities, it has been sometimes impossible to press in the transfer dies any further if the reactive pressure against the pressing into the resin layer 13 becomes locally high. Even with such a problem, the transfer die 15 according to the embodiment of the present invention can be easily pressed into the resin layer 13 by a control to be described later. The transfer die 15 is preferably such that an area at the center of the distance between two adjoining electromagnets 21 makes distortion within the range of elastic deformation, the distortion being greater than ¼ or preferably ½ the final depth of the concavo-convex pattern to be transferred, when a maximum allowable pressure of the transfer die 15 is applied to the central area.

The transfer die 15 is arranged so that its surface 15b' having the concavo-convex pattern to transfer is opposed to the surface 11a of the substrate 11. More specifically, the transfer die 15 has protrusions 15' on its sides, and the transfer die 15 is arranged so that the protrusions 15' come into contact with the tops of viscoelastic dampers 25 fixed on the chassis 23 from above (toward the −Y direction). Since the transfer die 15 is placed on the chassis 23 with the viscoelastic dampers 25 therebetween, the transfer die 15, even when subjected to pressures for pressing it toward the chassis 23, will not start moving immediately but will move downward gradually after a time delay given by the viscoelastic dumpers 25. It should be appreciated that if no control on the mutual physical relationship is intended until the transfer die 15 comes into contact with the substrate 11, the transfer die 15 may be placed directly on the resin layer 13 without using the viscoelastic dumpers 25.

A laser thickness meter 31 measures the distance between the substrate 11 and the transfer die 15 continuously while moving along a slit-like through hole 24 made in the chassis 23 (in particular, see FIG. 2). A signal from the laser thickness meter 31 is received by a thickness measurement unit 55, and transmitted to the central processing unit 51 along with a signal on the measuring position. It should be appreciated that while the diagram shows only a single laser thickness meter 31, a plurality of laser thickness meters 31 may be provided. The through hole 24 is not limited to the shown position, either. As will be described later, it is designed as appropriate so as to be capable of monitoring the inclination and local deformation of the transfer die 15. Moreover, the thickness meter 31 is not limited to the laser-based one. Thickness meters utilizing capacitance changes and ultrasonic reflection may also be used. In particular, in the case of the laser-based thickness meter 31, the substrate 11 and the resin layer 13 both need to be made of materials that can transmit the laser.

Next, the operation of the pattern transfer apparatus according to the first embodiment of the present invention will be described with reference to FIGS. 1 and 2.

A disc-shaped polycarbonate substrate 11, having a diameter of 18 cm, is prepared. A resin composed of a thermoplastic material such as polycarbonate, an acrylic resin, and a resist is applied onto the substrate 11 with a uniform thickness. It should be appreciated that the ambient temperature is adjusted to maintain the resin layer 13 at a desired viscosity. Moreover, a not-shown heater may be built in the transfer die 15 or the chassis 23. The substrate 11 is fixed to the position D of the chassis 23 by a not-shown jig. The transfer die 15 is arranged so that the protrusions 15' on its sides are placed on the viscoelastic dumpers 25, and the surface 15b' having the concavo-convex pattern is opposed to the resin layer 13.

Next, when the operator sends a trigger signal for starting a transfer operation to the central processing unit 51, the laser thickness meter 31 moves along the through hole 24 in the chassis 23 while transmitting measurements to the thickness measurement unit 55 continuously. The thickness measurement unit 55 calculates the distance between the substrate 11 and the transfer die 15, and continuously transmits it to the central processing unit 51 along with the information on the measuring positions. The central processing unit 51 stores the signals from the thickness measurement unit 55 for a certain period of time, and identifies the direction of inclination of the transfer die 15 with respect to the substrate 11. That is, it determines the direction where the transfer die 15 lies closest to the substrate 11 and the diagonal direction where it is farthest from the substrate 11. Here, since the transfer die 15 does not undergo any force such as a pressure from the resin layer 13, it has no distortion but only an inclination with respect to the substrate 11.

Based on the data stored in the central processing unit 51 in advance, the central processing unit 51 determines the amounts of current necessary to be passed through the respective electromagnets 21 in order to compensate the inclination of this transfer die 15, and transmits a signal to the pressure control unit 53. More specifically, assuming the arrangement of the electromagnets 21 shown in FIG. 2, though not limited thereto, the inclination is corrected by using the four electromagnets 21a that are arranged on the edge of the position D so as to be diagonal to each other. When the pressure control unit 53 passes the currents through the respective electromagnets 21 according to the signal from the central processing unit 51, the inclination of the transfer die 15 with respect to the substrate 11 is corrected so that the substrate 11 and the transfer die 15 lie in parallel with each other.

Subsequently, the central processing unit 51 transmits a signal to the pressure control unit 53 so as to pass the same current through the four electromagnets 21a, thereby making the electromagnets 21 generate magnetic forces of the same intensity. The transfer die 15 is given attractive forces uniform within the area in the direction toward the substrate 11. Consequently, the transfer die 15 and the substrate 11 approach each other while maintaining the parallelism therebetween. It should be appreciated that the distance between the transfer die 15 and the substrate 11 is monitored by the laser thickness meter 31 and the thickness measurement unit 55 even in this process, and the inclination correction as described above is performed when a deviation occurs in the parallelism between the two.

As described above, since the inclination of the transfer die 15 with respect to the substrate 11 is corrected while the transfer die 15 is brought closer to the substrate 11, it is possible to transfer the concavo-convex pattern of the transfer die 15 onto the resin layer 13 with accuracy. That is, if the transfer die 15 is pressed into the resin layer 13 as inclined and then this inclination is corrected, the projections of the transfer die 15 and the corresponding pits of the resin layer 13 cause gaps therebetween, which makes it impossible to transfer the concavo-convex pattern of the transfer die 15 onto the resin layer 13 with accuracy. Moreover, since the transfer die 15 is opposed to the substrate 11 in parallel, it is possible to press the transfer die 15 into the resin layer 13 with a smaller pressure. It is therefore also possible to avoid degradation of the transfer die 15.

Based on the signals from the thickness measurement unit 55, the central processing unit 51 detects that the transfer die 15 comes into contact with the resin layer 13. The central processing unit 51 transmits a signal to the pressure control unit 53 so as to pass a predetermined identical current through all the electromagnets 21 so that the transfer die 15 can be applied to the resin layer 13 with a higher pressure and the transfer die 15 undergoes a uniform pressure within the area. In response to this signal, the pressure control unit 53 passes the current through the electromagnets 21. As a result, all the electromagnets 21 generate magnetic forces of the same intensity.

When the transfer die 15 is put into contact with and pressed into the resin layer 13, the transfer die 15 undergoes reactive pressures of locally different intensities from the resin layer 13 depending on the densities of the concavo-convex pattern on the surface of the transfer die 15 and the flow of resin expelled by the projections of the concavo-convex pattern of the transfer die 15. In general, it is harder for the resin to flow in the central areas of the transfer die 15 than in the peripheral areas, and thus the transfer die 15 undergoes higher reactive pressures in the central areas than in the peripheral areas. As described above, at the point in time when the transfer die 15 comes into contact with the resin layer 13, the transfer die 15 is under a uniform pressure. It is the reactive pressures of locally different intensities that incline the transfer die 15 with respect to the substrate 11 or distort it locally. Here, the central processing unit 51 transmits a signal to the pressure control unit 53 so that the distance between the substrate 11 and the transfer die 15, measured by the laser thickness meter 31 and the thickness measurement unit 55, has an identical value across the entire area of the transfer die 15.

Initially, the method of controlling the transfer die 15 will be described for the case where the transfer die 15 is inclined with respect to the substrate 11.

The central processing unit 51 identifies the inclination of the transfer die 15 from the signals from the laser thickness meter 31 and the thickness measurement unit 55. The central processing unit 51 identifies the direction in which the transfer die 15 comes closest to the substrate 11, and transmits a signal to the pressure control unit 53 so as to decrease the attractive forces of the electromagnets 21 lying in that direction and, conversely, increase the attractive forces of the electromagnets 21 lying in the direction where the transfer die 15 is farthest from the substrate 11. The pressure control unit 53 receives this signal from the central processing unit 51, and passes predetermined currents through the respective electromagnets 21 accordingly. This operation is performed while monitoring the distance between the substrate 11 and the transfer die 15 by using the laser thickness meter 31 and the thickness measurement unit 55 until the inclination of the transfer die 15 with respect to the substrate 11 is resolved. It should be appreciated that the inclination of the transfer die 15 may be corrected by controlling the currents of the four electromagnets 21a alone as in the foregoing case before the transfer die 15 comes into contact with the resin 13, since it is troublesome to control all the electromagnets 21. In the meantime, all the currents flowing through the electromagnets 21 other than the four electromagnets 21a are kept constant. Here, the magnetic forces from the electromagnets 21 are inversely proportional to the distance. Thus, when the transfer die 15 is inclined, attractive forces increase to make the transfer die 15 and the electromagnets 21 approach in the direction where the distance therebetween is smaller, and attractive forces decrease to bring them apart in the direction where the distance is greater. In short, even if the attractive forces of the electromagnets 21 are constant, they function to emphasize inclination of the transfer die 15 once the inclination occurs. For this reason, the distance between the substrate 11 and the transfer die 15 is monitored continuously while the currents of the electromagnets 21 are gradually changed to correct the inclination of the transfer die 15.

Next, description will be given of the case where the transfer die 15 is locally distorted.

Based on the signals from the laser thickness meter 31 and the thickness measurement unit 55, the central processing unit 51 detects a local distortion of the transfer die 15 as an area where the distance between the substrate 11 and the transfer die 15 increases locally. The central processing unit 51 transmits a signal to the pressure control unit 53 so as to increase the current(s) of an electromagnet(s) 21 (not necessarily one) lying near the locally distorted area of the transfer die 15 so that the attractive force(s) of the electromagnet(s) 21 is/are increased. The pressure control unit 53 receives this signal from the central processing unit 51, and passes predetermined currents through the respective electromagnets 21 accordingly. This operation is performed while monitoring the distance between the substrate 11 and the transfer die 15 continuously until the local distortion of the transfer die 15 is resolved.

By the way, if the currents to be supplied to the electromagnets 21 exceed a maximum allowable value or a certain value before resolving the local distortion of the transfer die 15, it is preferable to increase the fluidity of the resin of the resin layer 13 in that area. For example, the central processing unit 51 interrupts all the currents of the electromagnets 21 temporarily, and then transmits a signal to the pressure control unit 53 so as to supply currents only to the electromagnets 21 that lie near the locally distorted area of the transfer die 15. The pressure control unit 53 receives this signal from the central processing unit 51, and controls the currents of the respective electromagnets 21 accordingly. It follows that attractive forces act only on the locally distorted area of the transfer die 15, with no attractive force around. This makes it easier for the resin of the resin layer 13 in that area to flow to the periphery. As a result, the distortion of the transfer die 15 can be resolved by passing currents lower than the maximum allowable value of the currents to be supplied to the electromagnets 21 or a certain value through the electromagnets 21 near the locally distorted area of the transfer die 15.

It should be appreciated that direct currents and alternating currents may be superimposed and passed through the electromagnets for the sake of controlling local flow of the resin layer 13. More specifically, while the direct-current components of the currents generate forces for attracting the transfer die 15, the alternating-current components heat the surface of the transfer die 15 locally by induction so that the resin layer 13 in contact with the same is locally heated for enhanced resin fluidity. In this case, the surface 15b' of the transfer die 15 having the concavo-convex pattern must be at least made of a metal material capable of induction heating.

This series of operations is repeated to maintain the transfer die 15 in parallel with the substrate 11 all the time while the local distortion of the transfer die 15 is compensated, and the transfer die 15 is put against and pressed into the substrate 11. Consequently, it is possible to transfer the concavo-convex pattern of the transfer die 15 onto the transfer target accurately regardless of the densities and depths of the concavo-convex pattern and the locations inside the transfer die 15 such as a central area and a peripheral area. It is also possible to transfer the concavo-convex pattern onto the flat resin layer accurately without causing distortion and the like on the surface of the transfer target.

When the central processing unit 51 detects that the signal from the thickness measurement unit 55 has a predetermined value, i.e., the transfer die 15 is pressed into the resin layer 13 by a predetermined amount, the ambient temperature is lowered to cure the resin layer 13. If a not-shown heater is used, the heater current is interrupted. It should be appreciated that when pits of the transfer die 15 are filled with the resin, the transfer die 15 will typically undergo high reactive pressures from the resin layer 13 abruptly. This makes it impossible to press the transfer die 15 into the resin layer 13 further. Then, the thickness measurement unit 55 no longer shows a change. This may be utilized to detect the end of press-in of the transfer die 15. Here, according to the method of the present invention, locally different pressures can be applied to the transfer die 15 from the electromagnets 21 even during the curing of the resin layer 13. It is therefore possible to maintain the pressures as is the case when the parallelism between the transfer die 15 and the substrate 11 and the distortion of the transfer die 15 are compensated, and the springback ascribable to the resin curing can be reduced preferably.

After the process of transferring the concavo-convex pattern, the transfer die 15 is released from the substrate 11 and the resin layer 13 to obtain a resin replica. The subsequent steps for manufacturing an optical disc will not be detailed here since they are known processes for manufacturing a recording medium.

The control step described in the foregoing transfer process is just an example of the method for controlling an apparatus according to the present invention. Methods using other control steps may also be used as long as the same effects are obtained from the other steps. For example, in the step of increasing the attractive forces of certain electromagnets 21, the attractive forces of the certain electromagnets may be kept unchanged while the attractive forces of the other electromagnets 21 are lowered.

Furthermore, the central processing unit 51 may have a built-in pressure control program tailored to the concavo-convex pattern of the transfer die 15 in advance, so that it controls the movement of the transfer die 15 accordingly through the pressure control unit 53 by using the electromagnets 21. In such cases, the laser thickness meter 31 and the thickness measurement unit 55 become unnecessary. For example, the central processing unit 51 may be provided with a pressure control program in advance such that the attractive forces of electromagnets 21 lying in the locations corresponding to the central area of the transfer die 15 where resin is hard to flow are increased as compared to the electromagnets 21 in the peripheral areas. Similarly, the central processing unit 51 may be provided with a pressure control program in advance such that the attractive forces of electromagnets 21 corresponding to areas where the concavo-convex pattern of the transfer die 15 is denser are increased as compared to surrounding areas. Moreover, areas of the transfer die 15 where accurate transfer is difficult may be checked in advance. Then, the central processing unit 51 is provided with a pressure control program in advance such that the attractive forces of electromagnets 21 falling on the positions corresponding to those areas are increased as compared to the electromagnets 21 lying in the other positions.

Furthermore, as a modification of the apparatus according to the embodiment of the present invention, the apparatus may have a sprue for injecting the resin of the resin layer 13 onto the substrate 11. In such cases, the central processing unit 51 may be provided with a pressure control program in advance so as to increase the attractive forces of electromagnets 21 lying in areas away from the sprue, aside from the foregoing control step.

The foregoing method may also be used with a photocurable resin instead of the thermosetting resin. In such cases, a light-transmitting transfer die 15 is preferably used since it facilitates the light irradiation for curing the resin.

Moreover, the foregoing method has dealt with such control that the distance between the substrate 11 and the transfer die 15 is made identical across the entire area of the transfer die 15. It is also possible, however, to exercise control to establish predetermined different target values at respective locations within the area. This makes it possible to deal with transfer dies having steps or inclinations, and address measurement errors of the laser thickness meter ascribable to die shapes or concavo-convex patterns.

Embodiment 2

A pattern transfer apparatus according to a second embodiment of the present invention will be described with reference to the accompanying drawings.

Figure 4:
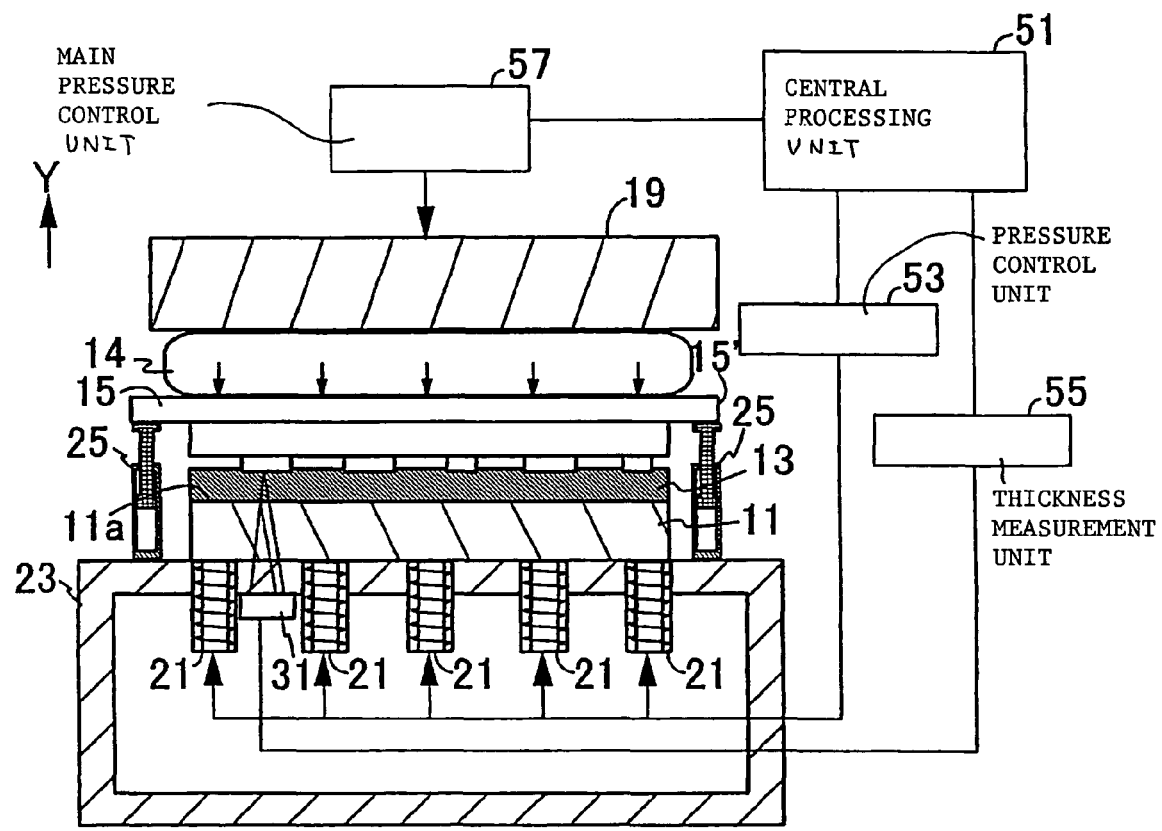
FIG. 4 is a diagram showing a pattern transfer apparatus according to a second embodiment of the present invention.

As shown in FIG. 4, the pattern transfer apparatus according to the second embodiment of the present invention is an apparatus for transferring a concavo-convex pattern formed on the surface of a transfer die 15 onto a resin layer 13 on a substrate 11 as in the first embodiment. A uniform pressure is applied to the transfer die 15 from above (in the -Y direction), and local attractive forces are given to the transfer die 15 by a plurality of electromagnets 21 arranged below the substrate 11, whereby the transfer die 15 is pressed into the softened resin 13.

More specifically, pressing means 19 applies a pressure uniform within the area to the transfer die 15 from above (in the -Y direction) via a balloon 14. It should be appreciated that the balloon 14 and the pressing means 19 may be means of any other known method such as a hydraulic press and a linear motor press as long as a pressure uniform within the area can be applied to the transfer die 15. The pressing means 19 is controlled by a main pressure control unit 57 which receives a signal from the central processing unit 51.

In the control method according to the present embodiment, the inclination and local distortion of the transfer die 15 are corrected by using the plurality of electromagnets 21 as in the first embodiment. In other respects, the method is the same as in the first embodiment, and a detailed description thereof will thus be omitted.

According to the second embodiment of the present invention, it is possible by this method to press the transfer die 15 into the resin layer 13 with a higher pressure as compared to the first embodiment. Transfer can thus be performed even when the resin of the resin layer 13 has high viscosity.

Embodiment 3

A pattern transfer apparatus according to a third embodiment of the present invention will be described with reference to the accompanying drawings.

Figure 5:
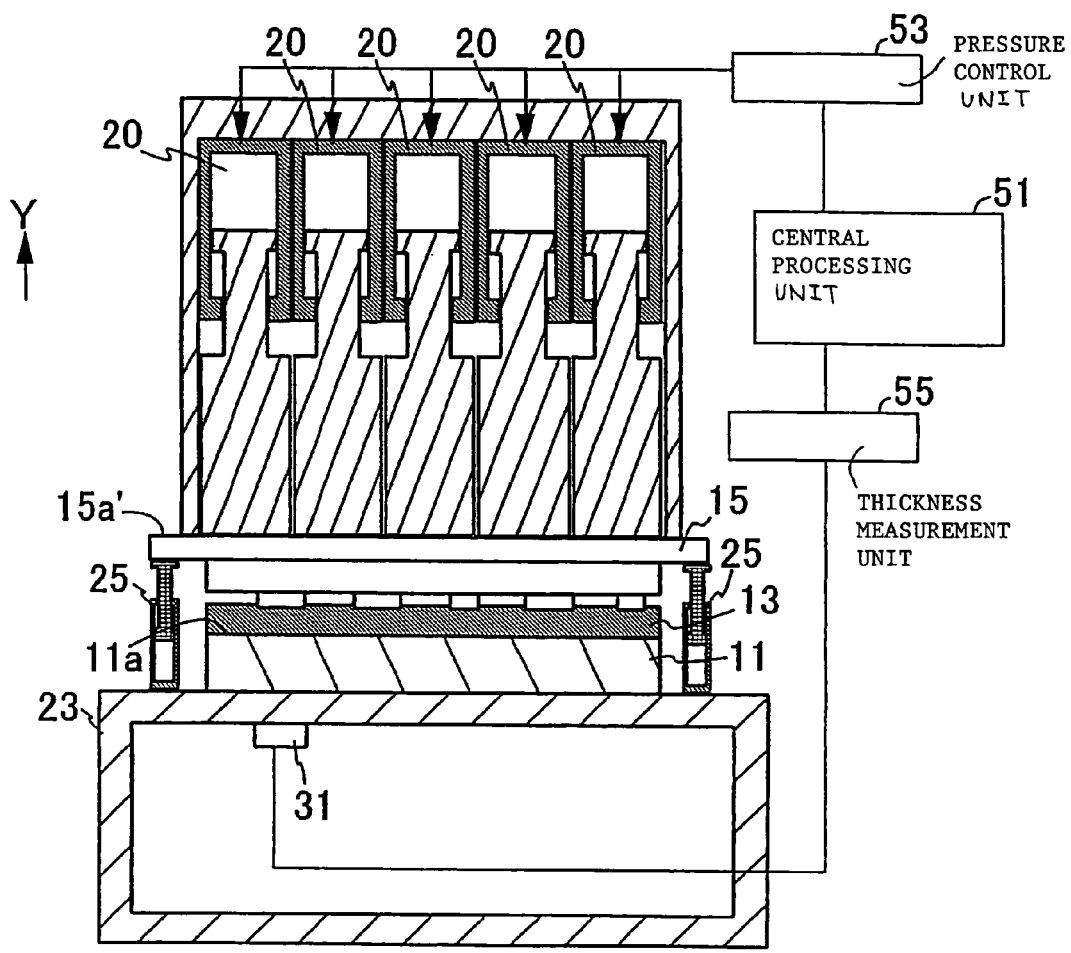
FIG. 5 is a diagram showing a pattern transfer apparatus according to a third embodiment of the present invention.

As shown in FIG. 5, the pattern transfer apparatus according to the third embodiment of the present invention is an apparatus for transferring a concavo-convex pattern formed on the surface of a transfer die 15 onto a resin 13 on a substrate 11. The transfer die 15 is pressed against the softened resin 13 from above (in -Y direction) by pressing means which includes a plurality of hydraulic cylinders 20 or the like.

More specifically, the hydraulic pressures of the plurality of hydraulic cylinder 20 arranged in contact with the surface 15a' are changed so as to apply area-by-area different pressures to the transfer die 15 with their pistons. Based on a signal from the central processing unit 51, a pressure control unit 53 controls the pressures for the respective hydraulic cylinders 20 to apply. That is, the present embodiment differs from the first and second embodiments in that the pressure control unit 53 controls the plurality of hydraulic cylinders 20 independently so as to correct inclination, local distortion, and the like of the transfer die 15. For other respects, see the description of the first and second embodiments.

In operation, the pattern transfer apparatus according to the third embodiment of the present invention exercises control by using the hydraulic cylinders 20 instead of the respective electromagnets 21 of the first embodiment. A detailed description will thus be omitted. It should be appreciated that air pressure cylinders using other operation fluids may be used instead of the hydraulic cylinders 20.

Aside from the advantages according to the foregoing embodiments, the third embodiment of the present invention makes it possible to press the transfer die into resin by using a plurality of hydraulic cylinders, which has conventionally been effected by a single hydraulic cylinder. It is therefore possible to miniaturize the hydraulic cylinders for a compact apparatus configuration. It is also possible to lower the mechanical machining precisions of the transfer die, the pressing device, and the like, with a reduction in manufacturing cost.

The present application is based on Japanese Patent Application No. 2004-98132.

The invention claimed is:

1. A pattern transfer apparatus for putting a transfer die having a concavo-convex pattern against a transfer target on a substrate to transfer the concavo-convex pattern onto a surface of said transfer target, wherein at least part of said transfer die is made of a ferromagnetic material; the pattern transfer apparatus comprising:

first pressing means for putting the transfer die onto the surface of said transfer target, said first pressing means including magnetic force generating means for generating a magnetic force and having at least two or more electromagnets which are provided to near said substrate;

wherein said magnetic force generating means applies a magnetic force to said transfer die with said substrate interposed therebetween, thereby pressing said transfer die against said substrate, the pattern transfer apparatus further comprising second pressing means for pressing said transfer die against a transfer target on said substrate uniformly, wherein said second pressing means includes: pressure applying means; and a balloon for transmitting a pressure of said pressure applying means to said transfer die.

2. The pattern transfer apparatus according to claim 1, wherein said pressing means includes a current controller for adjusting the amounts of current to flow through said electromagnets, respectively.

3. The pattern transfer apparatus according to claim 2, comprising: measuring means for measuring a distance between said substrate and said transfer die in at least two or more measuring points; and control means for receiving signals on the measuring points and the measured distances from said measuring means, determining currents to be applied to said respective electromagnets so that the measured distances at the measuring points become a predetermined value, and transmitting a signal to said current controller.

4. The pattern transfer apparatus according to claim 3, wherein said measuring means is a distance measuring device using laser reflection.

5. The pattern transfer apparatus according to claim 3, wherein said measuring means is a distance measuring device using ultrasonic reflection.

6. The pattern transfer apparatus according to claim 3, wherein said measuring means is a distance measuring device using a change in capacitance.

7. The pattern transfer apparatus according to claim 1, wherein said magnetic force generating means further has at least two or more permanent magnets which are embedded in a flat plate above the transfer die and are thus incapable of applying a magnetic force to the die with the substrate interposed therebetween, wherein the flat plate is made of light-transmitting materials and not made of a ferromagnetic material.

8. The pattern transfer apparatus according to claim 7, wherein said permanent magnets are placed so as to correspond to the positions of the electromagnets.

* * * * *